United States Patent [19]

Gay et al.

[11] Patent Number: 4,919,246
[45] Date of Patent: Apr. 24, 1990

[54] ASSEMBLY OF TWO GENERALLY ANNULAR MEMBERS, IN PARTICULAR A DIAPHRAGM AND SECURING MEMBER FOR A CLUTCH MECHANISM, PARTICULARLY FOR AN AUTOMOBILE

[75] Inventors: Christian Gay, Paris; Philippe Lassiaz, Boulogne, both of France

[73] Assignee: Valeo, Paris, France

[21] Appl. No.: 295,544

[22] Filed: Jan. 11, 1989

[30] Foreign Application Priority Data

Jan. 13, 1988 [FR] France ............................... 88 00302

[51] Int. Cl.$^5$ ............................................. F16D 13/44
[52] U.S. Cl. ..................................... 192/89 B; 192/98
[58] Field of Search ................... 192/89 B, 98, 110 B; 403/261, 376, 377

[56] References Cited

U.S. PATENT DOCUMENTS

| 4,084,674 | 4/1978 | de Gennes | 192/89 B |
| 4,326,611 | 4/1982 | Billet | 192/89 B |
| 4,399,897 | 8/1983 | Billet et al. | 192/89 B |
| 4,441,600 | 4/1984 | Caray | 192/89 B |
| 4,560,053 | 12/1985 | Lassiaz | 192/98 |
| 4,602,708 | 7/1986 | Nagano | 192/89 B X |
| 4,613,025 | 9/1986 | Despres | 192/89 B X |
| 4,660,701 | 4/1987 | Lassiaz et al. | 192/98 |
| 4,751,991 | 6/1988 | Naudin | 192/89 B |

FOREIGN PATENT DOCUMENTS

| 1475273 | 4/1969 | Fed. Rep. of Germany .... 192/89 B |
| 2419700 | 11/1975 | Fed. Rep. of Germany. |
| 7608568 | 9/1976 | Fed. Rep. of Germany . |
| 2544037 | 10/1984 | France . |
| 1069373 | 5/1967 | United Kingdom . |
| 2051976 | 1/1981 | United Kingdom . |
| 2062799 | 5/1981 | United Kingdom . |

Primary Examiner—Randolph A. Reese
Assistant Examiner—John Ricci
Attorney, Agent, or Firm—Charles E. Brown; Charles A. Brown

[57] ABSTRACT

The invention relates to an assembly of two members (10, 11). The first member (11) has a thrust portion (16) whereby it bears axially on the second member (10), on a first surface of the latter. The first member also has tabs (17) whereby it extends through the second member (10). Between the second member (10) and the tabs (17) of the first member (11), on the surface of the second member opposite to first member, an axially acting resilient ring (22) of the Belleville washer type is interposed. The invention is particularly applicable to the diaphragm of a clutch mechanism, particularly for an automobile, whereby it is attached to the securing member carried on the diaphragm to permit a declutching surface to be attached to the latter.

8 Claims, 1 Drawing Sheet

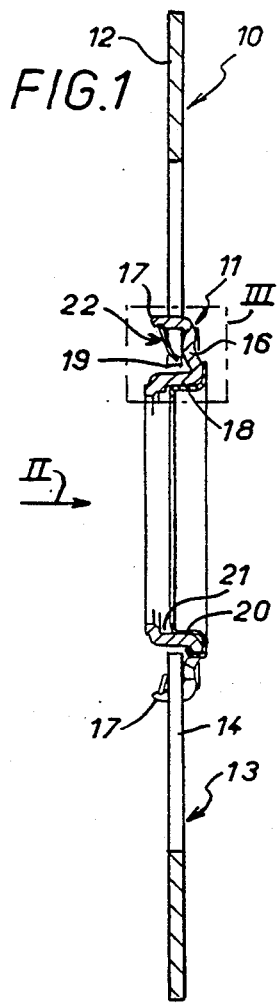
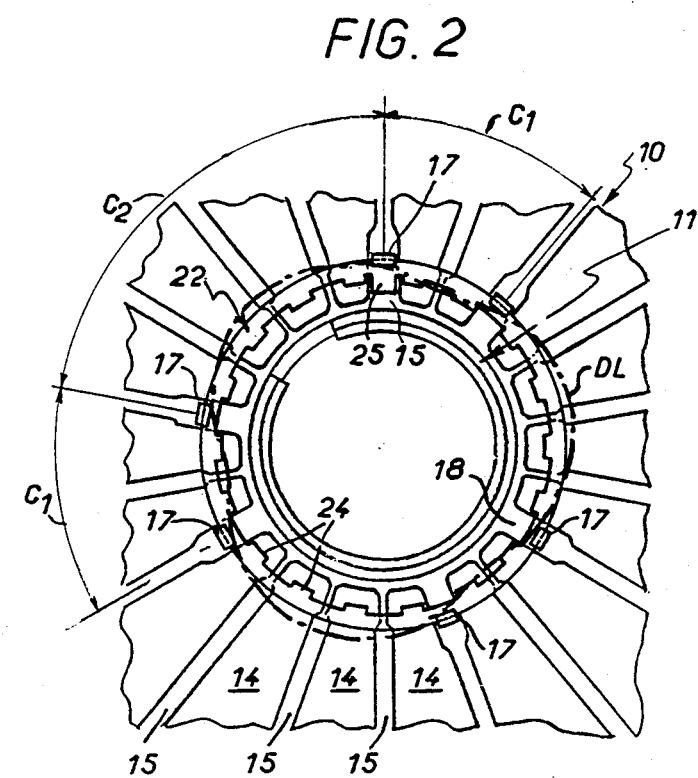
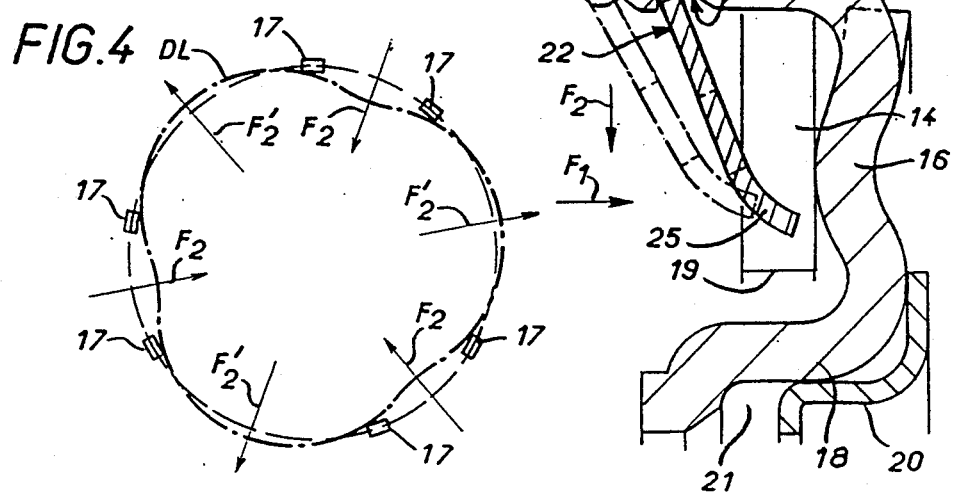

ASSEMBLY OF TWO GENERALLY ANNULAR MEMBERS, IN PARTICULAR A DIAPHRAGM AND SECURING MEMBER FOR A CLUTCH MECHANISM, PARTICULARLY FOR AN AUTOMOBILE

FIELD OF THE INVENTION

The present invention is generally concerned with assemblies comprising two generally annular members, of the kind in which one of the members has a thrust portion whereby it bears axially on the other member, and tabs whereby it extends through the latter.

BACKGROUND OF THE INVENTION

Such an assembly is used for example in certain automobile clutch mechanisms, in which the two members comprise the diaphragm and the securing member which is carried by the diaphragm for attaching a clutch release bearing to the latter.

The securing member bears axially on one face of the diaphragm, while on its opposite side it has, in association with its tabs, retaining means adapted to ensure that it is maintained in the required axial relationship with the diaphragm.

If this axial positioning is to be achieved without play, it has been found that fretting corrosion tends to occur, which is of course detrimental to the mechanism.

In order to avoid this disadvantage, it is desirable to arrange that the securing member is maintained permanently but resiliently in contact with the diaphragm.

With this in view it has been proposed, for example, to insert between the clutch release bearing and the diaphragm a resilient ring of the Belleville washer type, which bears against the clutch release bearing at the side of the diaphragm opposed to the thrust portion of the securing member. This resilient ring also bears axially on the diaphragm, thereby biassing the securing member against the diaphragm.

However, apart from the fact that, in a mechanism which is already quite complex, there is not always a suitable place available for insertion of such a Belleville washer, the problem remains of how to hold the Belleville washer conveniently prior to the assembly of the clutch release bearing with the securing member, since any tendency of the Belleville washer to move off centre will upset the assembly process.

SUMMARY OF THE INVENTION

A general object of the present invention is to provide an assembly which offers a solution to the above problem while at the same time affording the desired resilient biassing action.

According to the invention, there is provided an assembly of two generally annular members, wherein a first of the members has a thrust portion with tabs extending from the thrust portion, whereby the first member bears axially on a first side of the second of the members by means of the thrust portion and extends through the second members by means of the tabs, the assembly being characterised in that, between the tabs and the second member, an axially acting resilient ring of the Belleville washer is interposed at the side of the second member opposite to its first side.

Thus, according to the invention a resilient ring is interposed directly between the tabs of one of the members in question and the other member, while the tabs together ensure that the resilient ring is maintained in its required coaxial position. The various features and advantages of the invention will become more apparent from the description which follows. This description is given by way of example only and with reference to the accompanying diagrammatic drawings.

BRIEF DESCRIPTION OF THE DRAWINGS

FIG. 1 is a view in axial cross-section of an assembly according to the invention.

FIG. 2 is a partial view seen in elevation, in the direction indicated by the arrow II in FIG. 1.

FIG. 3 shows on a larger scale the detail of FIG. 1 which is enclosed in a broken square at III in FIG. 1.

FIG. 4 is a diagrammatic view based on FIG. 2, and illustrates the particular shape to which the resilient ring used in the assembly is deformed when being mounted in place.

DESCRIPTION OF A PREFERRED EMBODIMENT

The drawings show, by way of example, how the invention is applied in connection with an automobile clutch mechanism (not shown), where one of the members in question is a diaphragm 10 while the other is a securing member 11 arranged to allow a clutch release bearing, also not shown, to be attached to the diaphragm 10 in accordance with the type of arrangement which is described for example in U.S. Pat. No. 4 660 701.

The diaphragm comprises a generally annular member having an endless, circular peripheral portion 12 constituting a Belleville washer, together with a central portion 13 which is divided into radial fingers 14 alternating with openings 15.

The securing member 11 is also generally annular in form, and comprises a thrust portion 16 having a suitable profile, whereby the member 11 bears axially on a first face of the diaphragm 10 lying in the vicinity of the free ends of the radial fingers 14. The securing member 11 also has a plurality of tabs 17 extending from the periphery defining the greatest diameter of the thrust portion 16. The tabs 17 extend generally parallel to the axis of the assembly, with the member 11 extending through the diaphragm 10 by means of these tabs which are located in certain of the openings 15, the openings concerned being duly enlarged for this purpose.

In the embodiment shown in the drawings, the securing member 11 has, in addition, a sleeve portion 18 extending axially from the smaller or inner periphery of the thrust portion 16. By means of the sleeve portion 18 the member 11 extends axially through the central opening 19 of the diaphragm 10, for cooperation with the element which is provided for securing the associated clutch release bearing, in the way described in U.S. Pat. No. 4 660 701.

Finally, the securing member 11 in this embodiment carries a pressing 20 in the form of a sleeve which, with the sleeve portion 18, forms a cage 21 for retaining the above mentioned element.

These arrangements are not related to the present invention itself and will therefore not be described here in any greater detail.

In accordance with the invention, between the tabs 17 of the securing member 11 and the diaphragm 10, and at the side of the latter which is opposite to the side on which the thrust portion 16 of the securing member 11 bears, there is interposed an axially acting resilient ring 22 of the Belleville washer type.

The resilient ring 22 bears, through one of its peripheral zones (which in this example is the peripheral zone having the largest diameter) on notches 23. Each of these notches is individually formed, and extends transversely on a respective one of the tabs 17 of the securing member 11. The ring 22 bears on the diaphragm 10 through its other peripheral zone (which in this example is of course that having the smallest diameter).

The resilient ring 22 is, in this example, disposed entirely in the interior of the space delimited axially by, and radially inward of, the tab 17 of the securing member 11, and it bears on the diaphragm 10 in a position generally in axial alignment with the thrust portion 16 of the securing member 11. The corresponding peripheral zone of smallest diameter of the ring 22 is crenellated with radial tabs 24, having the same number of radial tabs 24 as there are fingers 14 on the diaphragm 10, i.e. with one radial tab 24 for each finger 14, so that each tab 14 bears upon a corresponding one of the fingers 14.

For indexing of the resilient ring 22 with respect to the diaphragm 10, and so that each of its radial tabs 24 will effectively lie against the corresponding finger 14 of the diaphragm, the ring 22 has at least one tongue 25 by means of which it is engaged in one of the openings 15 in the diaphragm 10. Each tongue 15 is slightly bent towards the diaphragm 10 and extends from the inner peripheral zone of the resilient ring 22. The tongue 25 is radially aligned with one of the tabs 17 of the securing member 11, so as to take advantage of the enlargement of the corresponding opening 15 of the diaphragm 10 which is provided for accommodating the tab 17.

Preferably, and as shown in the drawings, the securing member 11 has an even number of the tabs 17, six in this example, and these tabs are arranged in pairs, with the circumferential distance C1 separating the two tabs 17 of one pair from each other being smaller than the circumferential distance C2 which separates each pair of tabs from the next.

However, the pairs of tabs 17 are evenly spaced circumferentially from each other.

The notch 23 formed in each of these tabs 17 is formed in one of the sides, namely the side disposed furthest from the diaphragm 10, of a groove 27 formed in one of the faces of the tabs 17, in this example the face which is directed towards the axis of the assembly.

The depth of the groove 27 is sufficiently large for the resilient ring 22 to be located in it without being subjected to any radial constraint whatever.

Finally, the free end of each of the tabs 17 of the securing member 11 is formed with a chamfer 28, which is directed backwards towards the notch 23 and serves to facilitate the insertion by force of the resilient ring 22 in the notches 23. This forcible insertion of the ring 22 is carried out in the axial direction indicated by the arrow F1 in FIG. 3, which shows in phantom lines the configuration of the resilient ring 22 when it makes contact with the chamfer 28 of the tabs 17. The ring 22 is constrained so that it becomes radially deformed towards the axis of the assembly as indicated by the arrow F2 in FIG. 3, radially inward of the tabs 17 of the member 11 and, more precisely, in the region between the tabs 17 of each pair.

This radial deformation of the resilient ring 22 in one direction between the tabs 17 of any one pair is only made possible because the resilient ring 22 becomes radially deformed by way of reaction in the opposite direction between the successive pairs of tabs 17. This is indicated diagrammatically by arrows F'2 in FIG. 4.

The general result of this is that the resilient ring 22 becomes deformed so as to form lobes, of which there are three in this embodiment. This somewhat unusual deformation into a lobe-like form is indicated diagrammatically by the phantom line DL in FIGS. 2 and 4.

Once engaged in the notches 23 of the tabs 17, the resilient ring 22 springs back into its normal shape, while being thereafter suitably maintained centred by means of the tabs 17.

It is normally desirable to multiply the tabs 17 in order to obtain improved performance of the resilient ring 22 in service. However, its deformation into a lobed shape is inhibited by an increase in the number of the tabs 17. For this reason the limitation of the number of tabs 17 to six represents a satisfactory compromise, while their grouping in pairs facilitates the assumption of the lobed shape by the ring, while restricting the formation of lobes to the gaps between pairs of the tabs 17, without any lobe being formed between the two tabs of any one pair.

The present invention is of course not limited to the embodiment described and shown, but includes all practical variations. In particular, the resilient ring could just as well be located outside the space defined by the tabs of the securing member, and/or may bear on the diaphragm in a zone of the latter which is radially offset with respect to the zone on which the thrust portion of the securing member bears.

In addition, the resilient ring may be formed with a supplementary portion extending from the ring and comprising a tongue projecting from the periphery of smallest diameter, which is extended sufficiently for this purpose and is suitably shaped so that it can exert a resilient thrust on the clutch release bearing.

The scope for practical application of the invention is not restricted only to the assembly of the securing member with the diaphragm described, but extends to any assembly of two generally annular members whatsoever, where one of the member extends through the other by means of tabs.

What is claimed is:

1. A clutch diaphragm assembly comprising a clutch diaphragm, said clutch diaphragm including a Belleville washer, said clutch diaphragm having a periperal portion, a central portion divided into a plurality of radial fingers alternating with openings, and a central opening, a securing member for attaching a clutch release bearing to said radial fingers of said clutch diaphragm, said securing member having a thrust portion with tabs which extend from said thrust portion, said securing member further having a sleeve portion radially off-set to said tabs and extending from said thrust portion, wherein said securing member bears axially on a first side of said diaphragm in the vicinity of free ends of its radial fingers by means of said thrust portion and extending through said diaphragm by means of said tabs which are adapted to be received between adjacent pairs of radial fingers of said diaphragm, said sleeve portion received in said central opening of said diaphragm, an axially acting resilient ring of the Belleville washer type being interposed between said tabs and said diaphragm, said resilient ring being interposed at the side of said diaphragm opposite to its first side wherein said resilient ring bears through one of its peripheral zones on notches, each of which is individually formed to as to extend transversely in a respective one of the tabs of said securing member, and said resilient ring further bearing on said diaphragm through its other peripheral zone.

2. The clutch diaphragm assembly according to claim 2, wherein the peripheral zone whereby said resilient ring bears on said second member is crenellated.

3. The clutch diaphragm assembly according to claim 3, wherein the crenellated peripheral zone of said resilient ring comprises further tabs, there being the same number of said further tabs as there are of said radial fingers in said diaphragm, whereby each of said further tabs corresponds to a respective one of said radial fingers.

4. The clutch diaphragm assembly according to claim 4, wherein for indexing of said resilient ring with respect to said diaphragm, said resilient ring has at least one tongue whereby it engages with one of said opening of said diaphragm.

5. The clutch diaphragm assembly according to claim 1, wherein said resilient ring bears on said diaphragm in alignment with said thrust portion of said securing member.

6. The clutch diaphragm assembly according to claim 1, wherein each said tab of said securing member has at its free end a chamfer arranged to facilitate forcible engagement of the resilient ring therewith and in that the notch formed in each of said tabs is formed in one of the sides of a groove formed in one of the faces of the tab.

7. The clutch diaphragm assembly according to claim 1, wherein the first member has an even number of said tabs, these tabs being associated with each other in pairs, the circumferential distance between the two tabs on one pair being smaller than that separating each successive pair from the next.

8. The clutch diaphragm assembly according to claim 1, wherein the resilient ring is maintained centred by the tabs of the first member.

* * * * *